US012444097B1

United States Patent
Hu et al.

(10) Patent No.: US 12,444,097 B1
(45) Date of Patent: Oct. 14, 2025

(54) 2D-3D MEDICAL IMAGE REGISTRATION METHOD, DEVICE, COMPUTER DEVICE, AND STORAGE MEDIUM

(71) Applicant: SHENZHEN INSTITUTES OF ADVANCED TECHNOLOGY CHINESE ACADEMY OF SCIENCES, Guangdong (CN)

(72) Inventors: Ying Hu, Guangdong (CN); Peijie Jiang, Guangdong (CN); Shaolin Lu, Guangdong (CN); Yefeng Liang, Guangdong (CN); Yuanyuan Yang, Guangdong (CN); Lihai Zhang, Guangdong (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 0 days.

(21) Appl. No.: 18/977,937

(22) Filed: Dec. 12, 2024

Related U.S. Application Data

(63) Continuation of application No. PCT/CN2024/099919, filed on Jun. 18, 2024.

(51) Int. Cl.
*G06T 11/00* (2006.01)
*G06T 7/33* (2017.01)
(Continued)

(52) U.S. Cl.
CPC .............. *G06T 11/003* (2013.01); *G06T 7/33* (2017.01); *G06V 10/806* (2022.01); *G06V 10/82* (2022.01);
(Continued)

(58) Field of Classification Search
CPC ..................... G06T 11/003; G06T 7/33; G06T 2207/10072; G06T 2207/10124; G06V 10/806; G06V 10/82
See application file for complete search history.

(56) References Cited

FOREIGN PATENT DOCUMENTS

| CN | 112614169 A | 4/2021 |
| CN | 116549020 A | 8/2023 |
| CN | 118037793 A | 5/2024 |

OTHER PUBLICATIONS

Gopalakrishnan et al, Intraoperative 2D/3D Image Registration via Differentiable X-ray Rendering, 2024, arXiv: 2312.06358v2, pp. 1-18. (Year: 2024).*

(Continued)

*Primary Examiner* — Kathleen M Broughton

(57) ABSTRACT

The present disclosure relates to a 2D-3D medical image registration method. The method includes obtaining a preoperative CT image and an intraoperative Xray image of a target bone block, inputting the preoperative CT image and the intraoperative Xray image into a depth-based learning-based regression network, and roughly estimating an initial spatial posture of the target bone block by using the regression network; and adjusting a projection of the preoperative CT image based on the initial spatial posture to generate a DRR image; and inputting the DRR image, the intraoperative Xray image, and the preoperative CT image into a pre-trained correspondence point relationship estimation network, estimating a feature point corresponding relationship between the DRR image and the Xray image by using the corresponding point relationship estimation network, and optimizing the initial spatial posture according to the feature point corresponding relationship to obtain an optimized spatial posture.

6 Claims, 5 Drawing Sheets

(51) Int. Cl.
*G06V 10/80* (2022.01)
*G06V 10/82* (2022.01)

(52) U.S. Cl.
CPC ............... *G06T 2207/10072* (2013.01); *G06T 2207/10124* (2013.01)

(56) References Cited

OTHER PUBLICATIONS

Liu et al, 2D/3D Multimode Medical Image Registration Based on Normalized Cross-Correlation, 2022, MDPI applied sciences, pp. 1-16. (Year: 2022).*
Huang et al, Real-Time 2D/3D Registration via CNN Regression and Centroid Alignment, 2024, IEEE Transactions on Automation Science and Engineering, 22(2025): 85-98. (Year: 2024).*
International Search Report issued in corresponding International application No. PCT/CN2024/099919, mailed Nov. 25, 2024 (6 pages).
Written Opinion of the International Search Authority in corresponding International application No. PCT/CN2024/099919, mailed Nov. 25, 2024 (8 pages).

* cited by examiner

2D-3D MEDICAL IMAGE REGISTRATION METHOD, DEVICE, COMPUTER DEVICE, AND STORAGE MEDIUM

CROSS-REFERENCE TO RELATED APPLICATIONS

This application is a continuation of co-pending International Patent Application Number PCT/CN2024/099919, filed on Jun. 18, 2024, the disclosure of which is incorporated herein by reference in its entirety.

TECHNICAL FIELD

The present disclosure relates to medical image processing technology field, and particularly to a 2D-3D medical image registration method, apparatus, computer device and storage medium.

BACKGROUND

In a reduction surgery of pelvic fracture, an Xray fluoroscopy image is key data to assist doctors in determining a treatment. During the surgery, the doctors need to predict a spatial post of a fractured bone block via multiple X-fluoroscopy, thereby formulating a next reduction operation. A lack of visual field information of a fractured area poses a great challenge to spatial reasoning abilities of the doctors. Meanwhile, the multiple X-fluoroscopy can also cause a serious radiation damage to patients. A spatial pose of a real Xray image can be obtained by 2D-3D image registration. In the prior art, a common 2D-3D image registration method mainly includes:

1) Iterative optimization based on image similarity. This method uses gradients, intensities, and characteristics of a Computed Tomography (CT) image simulating a C-arm fluoroscopic projection image and an intraoperative Xray image as an optimization function. Optimal parameters are obtained through multiple iterations thereby realizing registration of the two images and obtaining the spatial pose of the current real Xray image via the optimal parameters. However, when an initial registration error is great, an optimization problem is usually a non-convex problem, easily trapped in a local optimal solution, and not suitable for the reduction surgery of pelvic fracture.

2) 2D-3D registration based on reinforcement learning. This method regards searching for best external parameters of analog C-arm for simulating and projecting the DRR image and real Xray image to perform registration, in the process of registration, as Markov process, and defines a six-degree-of-freedom state, an action function and a corresponding reward function, and optimizes in an environment through human agents. However, this algorithm requires a large amount of parameter space and occupies a large amount of computing resources. Meanwhile, a high-dimensional state space and a large action range bring a challenge to a training of reinforcement learning and require a long training time to be stable.

3) 2D-3D registration algorithm based on an anatomical landmark detection. This algorithm detects 2D coordinates and 3D spatial coordinates of multiple groups of anatomically labeled points on the Xray, and uses the pnp (Perspective-n-Point, method for solving 3D to 2D point pair motion) algorithm to calculate and obtain a spatial pose of the current pelvis. The algorithm requires a large number of manual labels and is complex and time consuming.

4). 2D-3D registration based on convolution neural network. The method directly predicts a spatial post of the pelvis corresponding to a single Xray image by convolution neural network. However, due to individual specificities of the pelvic fracture patients, an accuracy of registration for predicting the spatial post of the bone block directly through the convolutional neural network is low and is only suitable as an initial registration protocol.

SUMMARY

The present disclosure provides a 2D-3D medical image registration method and device, a computer device, and a storage medium, to resolve at least one of the foregoing technical problems in the prior art.

To resolve the foregoing problem, the present disclosure provides the following technical solutions:

A 2D-3D medical image registration method, comprising:
  obtaining a preoperative CT image and an intraoperative Xray image of a target bone block; inputting the preoperative CT image and the intraoperative Xray image into a regression network based on deep learning; and roughly estimating an initial spatial pose of the target bone block through the regression network;
  adjusting a projection of the preoperative CT image based on the initial spatial pose to generate a DRR image;
  inputting the DRR image, the intraoperative Xray image, and the preoperative Xray image into a pre-trained corresponding point relationship estimation network, estimating a feature point corresponding relationship between the DRR image and the Xray image by using the corresponding point relationship estimation network, and optimizing and updating the initial spatial pose of the target bone block according to the feature point corresponding relationship to obtain an optimized spatial pose.

The technical solution used in the embodiments of the present disclosure further comprises: the regression network comprises a CNN module, a transformer module and a feature fusion module, the CNN module comprises a feature extractor, two multi-layer perceptrons and an SVD decomposition module, the feature extractor takes first six layers of the efficientnet-B0 network as a baseline method, the two multi-layer perceptrons are respectively a rotation regression head and a translation regression head, and both the rotation regression head and the translation regression head are three-layer multi-layer perceptrons.

The technical solution used in the embodiments of the present disclosure further comprises: the regression network comprises a CNN module, a transformer module and a feature fusion module, the CNN module comprises a feature extractor, two multi-layer perceptrons and an SVD decomposition module, the feature extractor takes first six layers of the efficientnet-B0 network as a baseline method, the two multi-layer perceptrons are respectively a rotation regression head and a translation regression head, and both the rotation regression head and the translation regression head are three-layer multi-layer perceptrons.

The technical solution used in the embodiments of the present disclosure further comprises: roughly estimating an initial spatial pose of the target bone block through the regression network, comprising:
  inputting the intraoperative Xray image into a CNN module to extract a first feature;
  inputting the first feature into two multi-layer perceptrons, the two multi-layer perceptrons respectively outputting a rotation component and a translation component of the spatial post of the target bone block through the rotation regression head and the translation regression head;

converting an output of the rotational regression head into a matrix M of a set size, and inputting the matrix M into an SVD decomposition module to perform SVD decomposition to obtain UZVT, mapping a matrix U and a matrix V to SO (3) space, and obtaining a rotational component R of the spatial post of the target bone block, wherein, $$R = U\Sigma'V^T, \text{ where } \Sigma' = \text{diag}(1, \ldots, 1, \det(UV^T))$$

inputting the intraoperative Xray image into a transformer module, respectively a performing 3D position encoding and an image block encoding on the input image through the transformer module, and adding a 3D position encoding result and an image block encoding result to obtain a second feature of the intraoperative Xray image;

inputting the first feature and the second feature into a feature fusion module for modulation, and outputting the initial spatial pose of the target bone block.

The technical solution used in the embodiments of the present disclosure further comprises: wherein a 3D position encoding method of the transformer module comprises:

encoding a vertical position, a horizontal position and edge information of the intraoperative Xray image by using a sinusoidal position encoding, and extending a two-dimensional spatial coordinate (x, y) of each pixel into a three-dimensional coordinate (x, y, e) by adding the edge information; wherein the coding formula is defined as follows:

$$\begin{cases} PE(pos^D, 2i) = \sin(pos^D/10000^{2i/d}) \\ PE(pos^D, 2i+1) = \cos(pos^D/10000^{2i/d}) \end{cases},$$

Wherein, PE represents three-dimensional encoder information, $pos^D$ represents a position of an image block in dimension D, variable i represents i-th position encoding information.

The technical solution used in the embodiments of the present disclosure further comprises: inputting the first feature and the second feature into a feature fusion module for modulation, comprising:

the modulation formula is defined as follows:

$$F_{cin}^{i+1} = G_\alpha(F_t^i) \otimes BN(F_{cout}^i) \otimes G_\beta(F_t^i),$$

wherein $F_{cin}^{i+1}$ represents a (i+1)-th input feature of the CNN module, $F_t^i$ represents an i-th swim-block output feature, $F_{cout}^i$ represents an i-th output feature of the CNN module, G(•) represents a convolution operation, BN(•) represents a batch normalization, $\otimes$ represents a multiplication operation, and $\oplus$ represents an addition operation.

The technical solution used in the embodiments of the present disclosure further comprises: a loss function L of the regression network based on deep learning comprises a rotation component loss $L_o$ in SO(3) space and a translation component loss $L_t$ in Euclidean space, wherein the rotation component loss $L_o$ represents a geodesic distance between a predicted value R and a true value Rgt of the rotation component, and the translation component loss $L_t$ represents a translation error between a predicted value t and a true value tgt of the translation component, the loss function L is defined as follows:

$$L = L_o + \alpha L_t = \cos^{-1}\left(\frac{tr(RR_{gt}^T) - 1}{2}\right) + \frac{\|t - t_{gt}\|_2}{\|t_{gt}\|_2}.$$

The technical solution used in the embodiments of the present disclosure further comprises: optimizing and updating the initial spatial pose of the target bone block according to the feature point corresponding relationship to obtain an optimized spatial pose, comprising:

predicting to obtain an offset dp of a feature point p in the DRR image by the corresponding point relationship estimation network by using an optical flow algorithm GMflow based on global matching;

searching for a feature point p'=p+dp that matches with the feature point p in the intraoperative Xray image by the offset dp;

obtaining a feature corresponding point relationship between the DRR image and the intraoperative Xray image;

based on the feature corresponding point relationship, calculating a relative pose relationship matrix dT between the initial spatial pose and a target pose by a PPC slover algorithm;

optimizing and updating the initial spatial pose of the target bone block, according to the relative pose relationship matrix dT to obtain the optimized spatial pose of the bone block;

wherein the PPC slover algorithm establishes a relationship between a two-dimensional motion and a three-dimensional differential motion by using {p, p'}, a three-dimensional point w, and a gradient g between the DRR image and the intraoperative Xray image, and obtaining a relative relationship between the initial spatial pose and the target spatial pose by the following formula:

$$(g \times w^T - n^T)\delta v = g^T w$$

$$T = \begin{bmatrix} \cos\theta \cdot I + (1 - \cos\theta)rr^T + \sin\theta \cdot [r]_x & dv \\ 0 & 1 \end{bmatrix} [R_0|t_0],$$

wherein $dw^T$ represents a rotation vector, $dv^T$ represents a translation vector, and the rotation vector is converted into axis-angle representation, wherein an axis r=dw/∥dw∥, an angle θ=∥dw∥, and three-dimensional point are extracted from the preoperative CT image by a 3D sobel edge extractor.

Another technical solution used in the embodiments of the present disclosure is a 2D-3D medical image registration device, comprising:

a roughly estimation module, configured to obtain a preoperative Xray image and an intraoperative Xray image of a target bone block, input the preoperative Xray image and the intraoperative Xray image into a regression network based on deep learning, and roughly estimate an initial spatial pose of the target bone block through the regression network;

a DRR projection module, configured to adjust a projection of a preoperative DRR image based on the initial spatial pose to generate a DRR image; and a fine estimation module, configured to input the DRR image, the intraoperative Xray image, and the preoperative Xray image into a pre-trained corresponding point relationship estimation network, estimate a feature point correspondence between the DRR image and the Xray image by using the corresponding point relationship estimation network, and optimize and update the initial spatial pose of the target bone block according to the feature point correspondence to obtain an optimized spatial pose.

Another technical solution used in the embodiments of the present disclosure is a computer device, the computer device comprises a processor and a memory coupled to the processor, wherein the memory stores program instructions for implementing the 2D-3D medical image registration method; the processor is configured to execute the program instructions stored in the memory to control the 2D-3D medical image registration method.

Another technical solution used in the embodiments of the present disclosure is a storage medium, wherein a program instruction executable by a processor is stored, and the program instruction is used for executing the 2D-3D medical image registration method. Compared with the prior art, the embodiments of the present disclosure achieve the following beneficial effects: the 2D-3D medical image registration method and device, the computer device, and the storage medium according to the embodiments of the present disclosure provides a two-stage registration frame combining a roughly registration with a fine registration to predict the spatial pose of the bone block of the pelvic fracture patient. In the roughly registration stage, the initial spatial pose of the target bone block is roughly estimated by using the regression network based on the CNN-Transformer, and a convergence speed and an accuracy of the network are improved by estimating an x-ray light source rotation amount representation method. In the fine registration stage, the point-to-plane 2D-3D registration algorithm based on deep learning is used to further optimize the initial spatial pose predicted by the regression network, the global optical flow network and PPC are used to update the initial spatial pose of the target bone block, and a precise adjustment is completed by a few times of iterations. In the embodiments of the present disclosure, the model can be trained only according to the preoperative Xray image of the patient, the spatial post of the bone block can be predicted by using a single Xray image during the operation, no a large amount of data is required to be manually labeled, the running time is relatively fast, the radiation damage caused by repeated fluoroscopy to the doctor and the patient is greatly reduced, a difficulty that an optimal registration based on image similarity may easily falls into a local optimal under a large displacement is solved, and a relatively efficient and accurate registration can be realized under the large-range initial registration error.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely intended to explain the present disclosure, but are not intended to limit the present disclosure.

The following clearly and completely describes the technical solutions in the embodiments of the present disclosure with reference to the accompanying drawings in the embodiments of the present disclosure. Apparently, the described embodiments are only a part rather than all of the embodiments of the present disclosure. Based on the embodiments of the present disclosure, all other embodiments obtained by a person of ordinary skill in the art without creative efforts fall within the protection scope of the present disclosure.

The terms "first", "second", and "third" in this application are used only for description purposes, and cannot be understood as indicating or implying relative importance or implying a quantity of indicated technical features. Therefore, a feature defined as "first", "second", and "third" may explicitly or implicitly include at least one feature. In the description of this application, "multiple" means at least two, for example, two or three, unless otherwise specifically limited. All directional indications (such as up, down, left, right, front, and back) in the embodiments of the present disclosure. It is only used to explain a relative positional relationship, a motion condition, and the like between components in a specific posture (as shown in the accompanying drawings). If the specific posture changes, the directional indication changes accordingly. In addition, the terms "include" and "have" and any variations thereof are intended to cover the inclusion of non-exclusive. For example, a process, method, system, product, or computer device that includes a series of steps or units is not limited to a listed step or unit, but optionally further includes an unlisted step or unit, or optionally further includes another step or unit inherent to the process, method, product, or computer device.

Referring to "embodiments" herein means that the specific features, structures, or features described with reference to the embodiments may be included in at least one embodiment of the present disclosure. That the phrase appears at various locations in the specification does not necessarily refer to a same embodiment, nor is it a separate or alternative embodiment mutually exclusive with another embodiment. A person skilled in the art explicitly and implicitly understands that the embodiments described in this specification may be combined with other embodiments.

Figure 1:
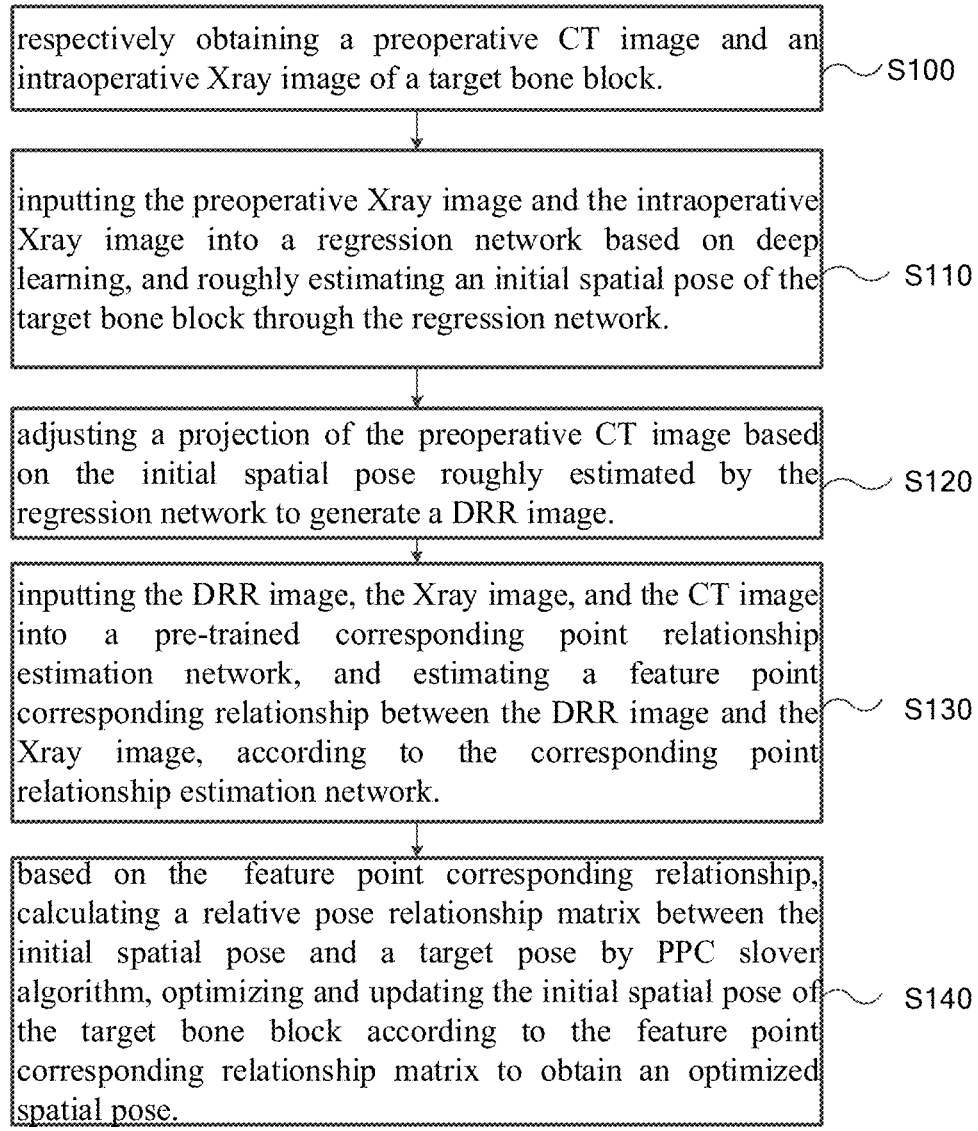
FIG. 1 is a flowchart of a 2D-3D medical image registration method according to an embodiment of the present disclosure.
Figure 2:
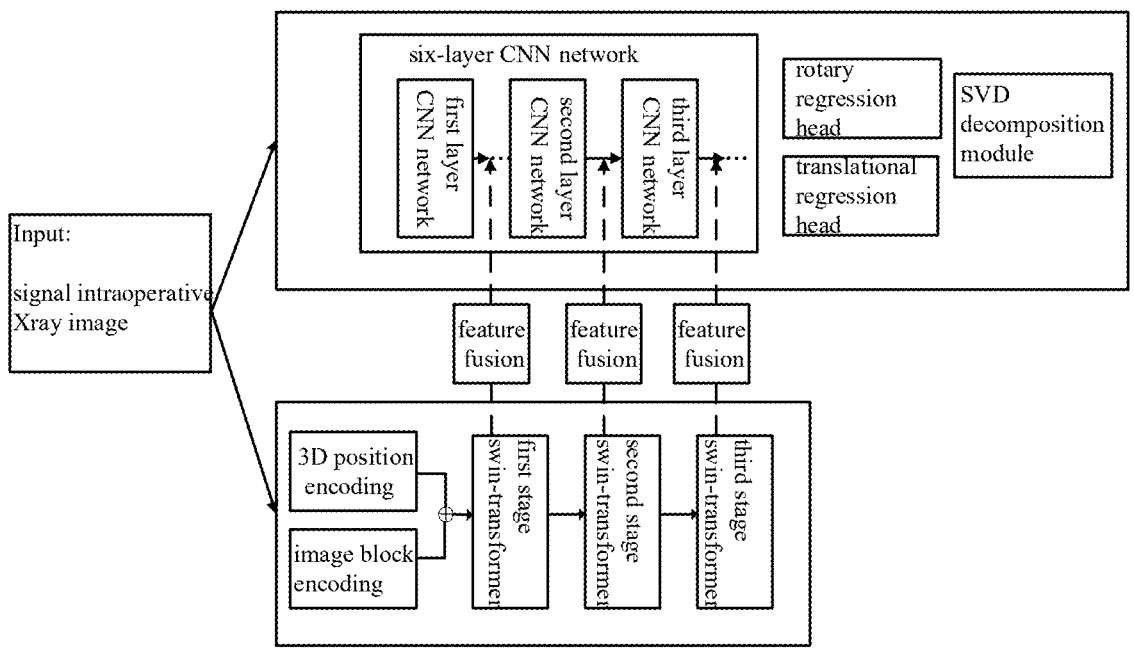
FIG. 2 is a schematic diagram of a regression network architecture based on deep learning according to an embodiment of the present disclosure.

FIG. 1 is a flowchart of 2D-3D medical image registration method, according to an embodiment of the present disclosure. The 2D-3D medical image registration method in this embodiment of the present disclosure includes the following steps:

S100: respectively obtaining a preoperative CT image and an intraoperative Xray image of a target bone block;

S110: inputting the preoperative Xray image and the intraoperative Xray image into a regression network based on deep learning, and roughly estimating an initial spatial pose of the target bone block through the regression network:

In the step, FIG. 2 illustrates a schematic diagram of a regression network architecture based on deep learning according to an embodiment of the present disclosure. The regression network includes a CNN (Convolutional Neural Network) module, a transformer module, and a feature fusion module. Wherein, the CNN module includes a feature extractor, two multi-layer perceptrons and an SVD decomposition module. The feature extractor takes first six layers of an efficientnet-B0 network as a baseline method. The two multi-layer perceptrons are respectively a rotary regression head and a translational regression head. Both the rotary regression head and the translational regression head are three-layer multi-layer perceptrons.

Based on the above-mentioned network structure, roughly estimating an initial spatial pose of the target bone block through the regression network includes:

S111: inputting the intraoperative Xray image into the CNN module for extracting a first feature;

S112: inputting the first extracted feature into the two multi-layer perceptrons. The two multi-layer perceptrons respectively output a rotation component and a translation component in a spatial post of the target bone block by the rotation regression head and the translation regression head. Wherein, an output dimension of the rotation regression head is nine, and an output dimension of the translation regression head is three. A specific dimension value can be set according to an actual application scenario.

S113: converting an output of the rotation regression head into a matrix M with a set size (e.g. 3×3, which can be set according to an actual application scenario), and inputting the matrix M into the SVD decomposition module for SVD decomposition to obtain $U\Sigma V^T$, mapping a matrix U and a matrix V into a SO(3) space, and obtaining a rotation component R of the spatial post of the target bone block, wherein, $$R = U\Sigma' V^T, \text{ where } \Sigma' = \text{diag}(1, \ldots, 1, \det(UV^T)) \quad (1).$$

S114: inputting the intraoperative Xray image into the transformer module, respectively performing a 3D position encoding and an image block encoding on the input image through the transformer module, adding an Xray position encoding result and an image block encoding result to obtain a second feature of the intraoperative Xray image, and transmitting the second feature to the CNN module. Wherein, the 3D position encoding method of the transformer module includes respectively encoding an encoding vertical position, a horizontal position and edge information of the intraoperative Xray image by a sine position encoding, and expanding a 2D spatial coordinate (x, y) of each pixel into a 3D coordinate (x, y, e) by adding edge information. The coding formula is defined as follows:

$$\begin{cases} PE(pos^D, 2i) = \sin(pos^D/10000^{2i/d}) \\ PE(pos^D, 2i+1) = \cos(pos^D/10000^{2i/d}) \end{cases} \quad (2)$$

In the formula (2), PE represents 3D encoder information, $pos^D$ represents positions of an image block in dimension D (i.e., the vertical position, the horizontal position and the edge information). Variable i represents coding information of an i-th position. In this embodiment, each dimension d is set to 32 thereby forming 96 positions composed of a spatial position and edge information. Specifically, dimension d can also be set to other values according to an actual application scenario.

S115: inputting the first feature extracted by the CNN module and the second feature extracted by the transformer module into the feature fusion module for modulation, and outputting the initial spatial pose of the target bone block. Wherein an output of each transformer module is modulated with an output of the i∈{1, 3, 4} layer of the CNN module. The modulation formula is defined as follows:

$$F_{cin}^{i+1} = G_\alpha(F_t^i) \otimes BN(F_{cout}^i) \oplus G_\beta(F_t^i) \quad (2).$$

Wherein, $F_{cin}^{i+1}$ represents a (i+1)-th input feature of the CNN module, $F_t^i$ represents an i-th swim-block output feature, $F_{cout}^i$ represents an i-th output feature of the CNN module, G(•) represents a convolution operation, BN(•) represents a batch normalization (batch normalization), ⊗ represents a multiplication operation, ⊕ and represents an addition operation.

In the embodiment, a loss function L of the regression network based on deep learning includes two parts, which are respectively a rotation component loss $L_o$ in the SO (3) space and a translation component loss $L_t$ in Euclidean space. The rotation component loss $L_o$ represents a geodesic distance between a predicted value R and a true value $Rg'$ of the rotation component, and the translation component loss $L_t$ represents a translation error between a predicted value t and a true value $tg'$ of the translation component, the loss function L is defined as follows:

$$L = L_o + \alpha L_t = \cos^{-1}\left(\frac{tr(RR_{gt}^T) - 1}{2}\right) + \frac{\|t - t_{gt}\|_2}{\|t_{gt}\|_2}. \quad (3)$$

S120: adjusting a projection of the preoperative CT image based on the initial spatial pose roughly estimated by the regression network to generate a DRR image;

S130: inputting the DRR image, the Xray image, and the CT image into a pre-trained corresponding point relationship estimation network, and estimating a feature point corresponding relationship between the DRR image and the Xray image, according to the corresponding point relationship estimation network.

In this step, the corresponding point relationship estimation network is substantially a feature matching network. The network estimates the feature point corresponding relationship between the DRR image and the intraoperative Xray image by using an optical flow algorithm GMflow based on global matching. By an optical flow prediction, an offset dp at a feature point p in the DRR image is obtained. By the offset dp, a feature point p'=p+dp matching with the feature point p in the intraoperative Xray image is found, a feature corresponding point relationship between the DRR image and the intraoperative Xray image is obtained. A loss function $L_{flow}$ of the corresponding point relation estimation network is defined as follow:

$$L_{flow} = \sum_{i=1}^{N} \gamma^{N-i} \|f_i - f_{gt}\|_1. \quad (4)$$

Wherein $f_i$ represents a predicted optical flow of an i-th refinement, $f_{gt}$ represents a distance between corresponding points of the DRR image and the intraoperative Xray image under a two-dimensional projection, γ represents a scale factor, and N represents a number of optical flow updates.

S140: based on the feature point corresponding relationship, calculating a relative pose relationship matrix dT between the initial spatial pose and a target pose by a PPC slover algorithm, and optimizing and updating the initial spatial pose of the target bone block according to the relative pose relationship matrix dT to obtain an optimized bone block spatial pose;

In this step, a point-to-plane (PPC) 2D-3D registration algorithm based on deep learning is proposed to further optimize the initial spatial pose predicted by the regression network. Based on the feature point corresponding relationship between the DRR image and the intraoperative Xray image, the relative pose relationship matrix dT between the current initial spatial pose and the target spatial pose is calculated by the PPC slover algorithm. Finally, the initial spatial pose $[R't']=dT \cdot [R_0|t_0]$ is updated by the relative relationship, and the spatial pose of the target bone block is continuously updated by circling the above-mentioned process for many times, so that a better registration effect is achieved between the DRR image and the intraoperative Xray image.

Specifically, the PPC slover algorithm establishes a relationship between a two-dimensional motion and a three-dimensional differential motion by using {p, p'}, a three-dimensional point w, and a gradient g between the DRR image and the intraoperative Xray image, and obtaining the relative relationship $\delta v = (dw^T \, dt^T)^T$ between the initial spatial pose and the target spatial pose by the formula (6):

$$(g \times w^T - n^T)\delta v = g^T w, \qquad (6)$$

$$T = \begin{bmatrix} \cos\theta \cdot I + (1-\cos\theta)rr^T + \sin\theta \cdot [r]_x & dv \\ 0 & 1 \end{bmatrix} [R_0|t_0], \qquad (7)$$

wherein $dw^T$ represents a rotation vector, $dv^T$ represents a translation vector, and the rotation vector is converted into axis-angle representation, wherein an axis $r=dw/\|dw\|$, an angle $\theta=\|dw\|$, and the three-dimensional point W are extracted from the preoperative CT image by a 3D sobel edge extractor.

The 2D-3D medical image registration method according to the embodiments of the present disclosure provides a two-stage registration frame combining a roughly registration with a fine registration to predict the spatial pose of the bone block of the pelvic fracture patient. In the roughly registration stage, the initial spatial pose of the target bone block is roughly estimated by using the regression network based on the CNN-Transformer, and a convergence speed and an accuracy of the network are improved by estimating an x-ray light source rotation amount representation method. In the fine registration stage, the point-to-plane 2D-3D registration algorithm based on deep learning is used to further optimize the initial spatial pose predicted by the regression network, the global optical flow network and PPC are used to update the initial spatial pose of the target bone block, and a precise adjustment is completed by a few times of iterations. In the embodiments of the present disclosure, the model can be trained only according to the preoperative Xray image of the patient, the spatial post of the bone block can be predicted by using a single Xray image during the operation, no a large amount of data is required to be manually labeled, the running time is relatively fast, the radiation damage caused by repeated fluoroscopy to the doctor and the patient is greatly reduced, a difficulty that an optimal registration based on image similarity may easily falls into a local optimal under a large displacement is solved, and a relatively efficient and accurate registration can be realized under the large-range initial registration error.

Figure 3:
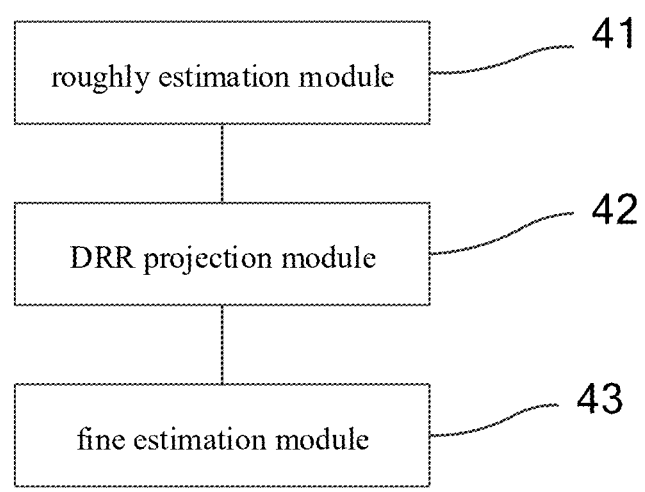
FIG. 3 is a block diagram of a 2D-3D medical image registration device according to an embodiment of the present disclosure.

FIG. 3 is a block diagram of a 2D-3D medical image registration device according to an embodiment of the present disclosure. The 2D-3D medical image registration device 40 in this embodiment of the present disclosure includes:

A roughly estimation module 41, configured to obtain a preoperative CT image and an intraoperative Xray image of a target bone block, input the preoperative CT image and the intraoperative Xray image into a regression network based on deep learning, and roughly estimate an initial spatial post of the target bone block by using the regression network.

A DRR projection module 42, configured to adjust a projection of the preoperative CT image based on the initial spatial post to generate a DRR image.

A fine estimation module 43, configured to input the DRR image, the intraoperative Xray image, and the preoperative CT image into a pre-trained corresponding point relationship estimation network, estimate a feature point corresponding relationship between the DRR image and the Xray image by using the corresponding point relationship estimation network, and optimize the initial spatial post of the target bone block according to the feature point corresponding relationship to obtain an optimized spatial post.

It should be noted that contents such as information exchange and execution process between the above-mentioned apparatuses/units is based on a same concept as that in the method embodiments of the present disclosure, and specific functions and technical effects brought by the apparatus/unit. For details, refer to a part of the method embodiments. Details are not described herein again.

The device provided in this embodiment of the present disclosure may be applied to the above-mentioned method embodiment. For details, refer to the description of the above-mentioned method embodiment. Details are not described herein again.

Figure 4:
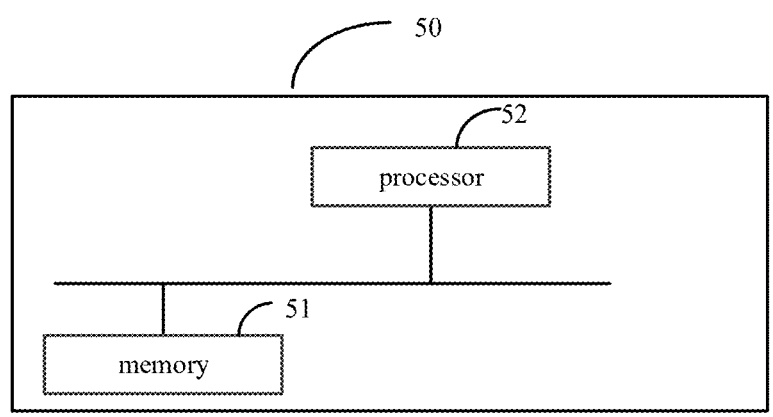
FIG. 4 is a block diagram of a computer device, according to an embodiment of the present disclosure.

Referring to FIG. 4, FIG. 4 is a block diagram of a computer device, according to an embodiment of the present disclosure. The computer device 50 includes:

a memory 51 that stores an executable program instruction; and a processor 52 connected to the memory 51.

The processor 52 is configured to invoke an executable program instruction stored in the memory 51, and execute the following steps: obtaining a preoperative CT image and an intraoperative Xray image of a target bone block, inputting the preoperative CT image and the intraoperative Xray image into a regression network based on deep learning, and roughly estimate an initial spatial post of the target bone block by using the regression network. Adjusting the projection of the preoperative CT image based on the initial spatial post to generate a DRR image; and inputting the DRR image, the intraoperative Xray image, and the preoperative CT image into a pre-trained corresponding point relationship estimation network, estimating a feature point corresponding relationship between the DRR image and the Xray image by using the corresponding point relationship estimation network, and optimizing the initial spatial post of the target bone block according to the feature point corresponding relationship to obtain an optimized spatial post.

The processor 52 may also be referred to as a CPU (Central Processing Unit, Central Processing Unit). The processor 52 may be an integrated circuit chip, and have a signal processing capability. The processor 52 may further be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like.

Figure 5:
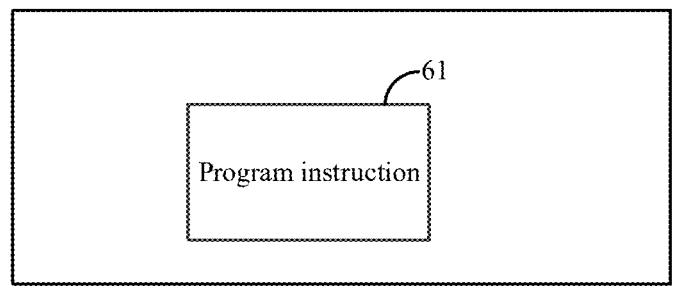
FIG. 5 is a block diagram of a storage medium, according to an embodiment of the present disclosure.

Referring to FIG. 5, FIG. 5 is a block diagram of a storage medium, according to an embodiment of the present disclosure. The storage medium in the embodiment of the disclosure stores a program instruction 61 that can implement the following steps: obtaining a preoperative CT image and an intraoperative Xray image of a target bone block, inputting the preoperative CT image and the intraoperative Xray image into a regression network based on deep learning, and roughly estimating an initial spatial post of the target bone block by using the regression network, and adjusting a projection of the preoperative CT image based on the initial spatial post to generate a DRR image; and inputting the DRR image, the intraoperative Xray image, and the preoperative CT image into a pre-trained corresponding point relationship estimation network, estimating a feature point corresponding relationship between the DRR image and the Xray image by using the corresponding point relationship estimation network, and optimizing the initial spatial post of the target bone block according to the feature point corresponding relationship to obtain an optimized spatial post. The program instruction 61 may be stored in the above-mentioned storage medium in a form of a software product, and includes several instructions for instructing a computer device (which may be a personal computer, a server, or a network computer device) or a processor (processor) to perform all or a part of the steps of the methods in the embodiments of the present disclosure. The foregoing storage medium includes any medium that can store a program instruction, such as a USB flash drive, a removable hard disk, a read-only memory (ROM, Read-Only Memory), a random-access memory (RAM, Random Access Memory), a magnetic disk, or an optical disc, or a terminal computer device such as a computer, a server, a mobile phone, or a tablet. The server may be an independent server, or may be a cloud server that provides a basic cloud computing service such as a cloud service, a cloud database, a cloud computing, a cloud function, cloud storage, a network service, cloud communication, a middleware service, a domain name service, a security service, a Content Delivery Network (Content Delivery Network, CDN), and a big data and an artificial intelligence platform.

In the embodiments provided in the present disclosure, it should be understood that the disclosed system, apparatus, and method may be implemented in another manner. For example, the described system embodiment is merely an example. For example, unit division is merely logical function division. In actual implementation, there may be another division manner. For example, multiple units or components may be combined or integrated into another system, or some features may be ignored or not performed. On the other hand, the displayed or discussed mutual coupling or direct coupling or communication connection may be through some interfaces, indirect coupling or communication connection of the apparatus or unit, and may be in an electrical, mechanical, or other form.

In addition, functional units in the embodiments of the present disclosure may be integrated into one processing unit, or each unit may exist separately physically, or two or more units may be integrated into one unit. The foregoing integrated unit may be implemented in a form of hardware, or may be implemented in a form of a software functional unit. The foregoing descriptions are merely implementations of the present disclosure, and are not intended to limit the scope of the present disclosure. Any equivalent structure or equivalent procedure transformation performed by using the content in the specification and accompanying drawings of the present disclosure, or directly or indirectly applied in another related technical field is included in the protection scope of the present disclosure.

The present disclosure is described with reference to current preferred implementations. However, it should be understood by a person skilled in the art that the foregoing preferred implementations are merely intended to describe the present disclosure, and are not intended to limit the protection scope of the present disclosure. Any modification, equivalent replacement, or improvement made without departing from the spirit and the principle of the present disclosure shall fall within the protection scope of the present disclosure.

What is claimed is:

1. A 2D-3D medical image registration method, comprising:

obtaining a preoperative CT image and an intraoperative Xray image of a target bone block; inputting the preoperative CT image and the intraoperative Xray image into a regression network based on deep learning; and roughly estimating an initial spatial pose of the target bone block through the regression network;

adjusting a projection of the preoperative CT image based on the initial spatial pose to generate a digitally reconstructed radiograph (DRR) image;

inputting the DRR image, the intraoperative Xray image, and the preoperative CT image into a pre-trained corresponding point relationship estimation network, estimating a feature point corresponding relationship between the DRR image and the Xray image by using the corresponding point relationship estimation network, and optimizing and updating the initial spatial pose of the target bone block according to the feature point corresponding relationship to obtain an optimized spatial pose;

wherein the regression network comprises a CNN module, a transformer module and a feature fusion module, the CNN module comprises a feature extractor, two multi-layer perceptrons and a singular value (SVD) decomposition module, the feature extractor takes first six layers of the efficientnet-B0 network as a baseline method, the two multi-layer perceptrons are respectively a rotation regression head and a translation regression head, and both the rotation regression head and the translation regression head are three-layer multi-layer perceptrons;

wherein roughly estimating an initial spatial pose of the target bone block through the regression network, comprises:

inputting the intraoperative Xray image into a CNN module to extract a first feature;

inputting the first feature into two multi-layer perceptrons, the two multi-layer perceptrons respectively outputting a rotation component and a translation component of the spatial pose of the target bone block through the rotation regression head and the translation regression head;

converting an output of the rotational regression head into a matrix M of a set size, and inputting the matrix M into the SVD decomposition module to perform SVD decomposition to obtain $U\Sigma V^T$, mapping a matrix U and a matrix V to SO(3) space, wherein SO(3) space refers to three dimensional rotations in Euclidean space, and obtaining a rotational component R of the spatial pose of the target bone block, wherein, $$R = U\Sigma'V^T, \text{ where } \Sigma' = \text{diag}(1, \ldots, 1, \det(UV^T)),$$

inputting the intraoperative Xray image into the transformer module, respectively a performing 3D position encoding and an image block encoding on the input image through the transformer module, and adding a 3D position encoding result and an image block encoding result to obtain a second feature of the intraoperative Xray image;

inputting the first feature and the second feature into the feature fusion module for modulation, and outputting the initial spatial pose of the target bone block;

wherein a 3D position encoding method of the transformer module comprises:

encoding a vertical position, a horizontal position and edge information of the intraoperative Xray image by using a sine position encoding, and extending a two-dimensional spatial coordinate (x, y) of each pixel into a three-dimensional coordinate (x, y, e) by adding the edge information; wherein the coding formula is defined as follows:

$$\begin{cases} PE(pos^D, 2i) = \sin(pos^D/10000^{2i/d}) \\ PE(pos^D, 2i+1) = \cos(pos^D/10000^{2i/d}) \end{cases},$$

wherein, PE represents three-dimensional encoder information, $pos^D$ represents a position of an image block in dimension D, variable i represents i-th position encoding information.

2. The 2D-3D medical image registration method according to claim 1, wherein inputting the first feature and the second feature into a feature fusion module for modulation, comprises:

the modulation formula is defined as follows:

$$F_{cin}^{i+1} = G_\alpha(F_t^i) \otimes BN(F_{cout}^i) \otimes G_\beta(F_t^i),$$

wherein $F_{cin}^{i+1}$ represents a (i+1)-th input feature of the CNN module, $F_t^i$ represents an i-th swim-block output feature, $F_{cout}^i$ represents an i-th output feature of the CNN module, G(•) represents a convolution operation, BN(•) represents a batch normalization, ⊗ represents a multiplication operation, and ⊕ represents an addition operation.

3. The 2D-3D medical image registration method according to claim 2, wherein a loss function L of the regression network based on deep learning comprises a rotation component loss $L_o$ in SO(3) space and a translation component loss $L_t$ in Euclidean space, wherein the rotation component loss $L_o$ represents a geodesic distance between a predicted value R and a true value Rgt of the rotation component, and the translation component loss $L_t$ represents a translation error between a predicted value t and a true value $tg^t$ of the translation component, the loss function L is defined as follows:

$$L = L_o + \alpha L_t = \cos^{-1}\left(\frac{tr(RR_{gt}^T)-1}{2}\right) + \frac{\|t - t_{gt}\|_2}{\|t_{gt}\|_2}.$$

4. The 2D-3D medical image registration method according to claim 3, wherein optimizing and updating the initial spatial pose of the target bone block according to the feature point corresponding relationship to obtain an optimized spatial pose, comprises:

predicting and obtaining an offset dp of a feature point p in the DRR image by the corresponding point relationship estimation network by using an optical flow algorithm GM flow based on global matching;

searching for a feature point p'=p+dp that matches with the feature point p in the intraoperative Xray image by the offset dp;

obtaining a feature corresponding point relationship between the DRR image and the intraoperative Xray image;

based on the feature corresponding point relationship, calculating a relative pose relationship matrix dT between the initial spatial pose and a target pose by a point-to-plane correspondence (PPC) solver algorithm; and optimizing and updating the initial spatial pose of the target bone block, according to the relative pose relationship matrix dT to obtain the optimized spatial pose of the bone block;

wherein the PPC solver algorithm establishes a relationship between a two-dimensional motion and a three-dimensional differential motion by using {p, p'}, a three-dimensional point w, and a gradient g between the DRR image and the intraoperative Xray image, and obtaining a relative relationship between the initial spatial pose and the target spatial pose by the following formula:

$$(g \times w^T - n^T)\delta v = g^T w$$

$$T = \begin{bmatrix} \cos\theta \cdot I + (1-\cos\theta)rr^T + \sin\theta \cdot [r]_x & dv \\ 0 & 1 \end{bmatrix}[R_0|t_0],$$

wherein $dw^T$ represents a rotation vector, $dv^T$ represents a translation vector, and the rotation vector is converted into axis-angle representation, wherein an axis $r=dw/\|dw\|$, an angle $\theta=\|dw\|$, and three-dimensional point are extracted from the preoperative CT image by a 3D sobel edge extractor.

5. A computer device, comprising: a processor and a memory coupled to the processor, wherein the memory stores program instructions for implementing the 2D-3D medical image registration method according to claim 1;

the processor is configured to execute the program instructions stored in the memory to control the 2D-3D medical image registration method.

6. A non-transitory computer-readable storage medium, storing a program instruction executable by a processor, wherein the program instruction is used for executing the 2D-3D medical image registration method according to claim 1.

* * * * *